(12) United States Patent
Itadani et al.

(10) Patent No.: US 9,841,106 B2
(45) Date of Patent: Dec. 12, 2017

(54) SLIDING PARTS

(71) Applicant: EAGLE INDUSTRY CO., LTD., Tokyo (JP)

(72) Inventors: Masatoshi Itadani, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/122,483

(22) PCT Filed: Jun. 25, 2015

(86) PCT No.: PCT/JP2015/068318
§ 371 (c)(1),
(2) Date: Aug. 30, 2016

(87) PCT Pub. No.: WO2015/199172
PCT Pub. Date: Dec. 30, 2015

(65) Prior Publication Data
US 2017/0102074 A1    Apr. 13, 2017

(30) Foreign Application Priority Data
Jun. 26, 2014  (JP) .................. 2014-131056

(51) Int. Cl.
*F16J 15/00*     (2006.01)
*F16J 15/34*     (2006.01)
*F16J 15/16*     (2006.01)

(52) U.S. Cl.
CPC ............. *F16J 15/34* (2013.01); *F16J 15/164* (2013.01)

(58) Field of Classification Search
CPC .................. F16J 15/34; F16J 15/164
(Continued)

(56) References Cited

U.S. PATENT DOCUMENTS 4,406,466 A * 9/1983 Geary, Jr. ............ F16J 15/3412
                                                            277/347
5,201,531 A * 4/1993 Lai ...................... F16J 15/3412
                                                            277/400
(Continued)

FOREIGN PATENT DOCUMENTS

CN   103097782    5/2013
JP   H08193662    7/1996
(Continued)

OTHER PUBLICATIONS

International Preliminary Report on Patentability issued in application No. PCT/JP2015/068318, dated Dec. 27, 2016 (5 pgs).
(Continued)

*Primary Examiner* — Nathan Cumar
(74) *Attorney, Agent, or Firm* — Hayes Soloway P.C.

(57) ABSTRACT

A pair of sliding parts includes a plurality of dimples formed along a circumferential direction with substantially fixed width from a cavitation formation region on an upstream side of each of the dimples to a positive pressure generation region on a downstream side of each of the dimples. An upstream beginning end of the cavitation formation region is formed in a tapered shape from a low pressure fluid side toward a high pressure fluid side, and disposed so as to overlap a positive pressure generation region of the dimple arranged on the upstream side in a radial direction. A low pressure fluid side edge of the positive pressure generation region is formed in a tapered shape from the low pressure fluid side toward the high pressure fluid side and smoothly connected to a low pressure fluid side edge of the cavitation formation region.

3 Claims, 6 Drawing Sheets

(58) Field of Classification Search
USPC .......................................................... 277/579
See application file for complete search history.

(56) References Cited

U.S. PATENT DOCUMENTS

| | | | | |
|---|---|---|---|---|
| 5,498,007 | A * | 3/1996 | Kulkarni | F16J 15/3412 |
| | | | | 277/366 |
| 5,501,470 | A * | 3/1996 | Fuse | F16J 15/3424 |
| | | | | 277/400 |
| 6,655,693 | B2 * | 12/2003 | Hosanna | F16J 15/3404 |
| | | | | 277/358 |
| 9,347,566 | B2 | 5/2016 | Tokunaga | F16J 15/3412 |
| 2005/0212217 | A1 * | 9/2005 | Tejima | F16J 15/3412 |
| | | | | 277/399 |
| 2013/0209011 | A1 * | 8/2013 | Tokunaga | F16C 17/045 |
| | | | | 384/123 |
| 2015/0115537 | A1 | 4/2015 | Tokunaga | F16J 15/34 |
| 2015/0377297 | A1 * | 12/2015 | Tokunaga | F16J 15/3412 |
| | | | | 384/119 |

FOREIGN PATENT DOCUMENTS

| | | |
|---|---|---|
| JP | 2005180652 | 7/2005 |
| WO | 2012 046749 wT | * 12/2012 |
| WO | WO2014050920 | 4/2014 |
| WO | WO2014061544 | 4/2014 |

OTHER PUBLICATIONS

International Search Report (w/translation) and Written Opinion (no. translation) issued in application No. PCT/JP2015/068318, dated Aug. 4, 2016 (6 pgs).
First Notification of Reason for Refusal Issued in Corresponding Chinese Patent Application Serial No. 201580012272.6 dated Mar. 17, 2017, with English Translation (7 Pgs.).

* cited by examiner

HIGH PRESSURE
FLUID SIDE
(SEALED FLUID SIDE)

LOW PRESSURE
FLUID SIDE
(ATMOSPHERE SIDE)

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In order to maintain a sealing property for a long time in a mechanical seal serving as one example of sliding parts, contradictory conditions of "sealing" and "lubricity" have to be met at the same time. In recent years especially, there has been an even greater demand for lower friction in order to reduce mechanical loss while preventing leakage of a sealed fluid for environmental measures or the like. Lower friction can be achieved by generating dynamic pressure between sealing faces by rotation and letting the sealing faces slide in a state that a liquid film lies between the sealing faces, so-called bringing into a fluid lubrication state. However, since positive pressure is generated between the sealing faces in this case, a fluid flows to the outside of sealing faces from a positive pressure part. This corresponds to side leakage in a bearing and leakage in a case of sealing.

The viscosity of liquid is greater than that of gas and thus, in a case of the liquid sealing even between plain faces, a dynamic pressure effect can be obtained by a minute undulation, rough recesses and projections, or the like on the faces. Therefore, a structure giving priority to a sealing performance is often adopted. Meanwhile, several mechanisms having a pumping effect of bringing leaked liquid back to the high pressure side in order to obtain the sealing and the lubricity at the same time are proposed. For example, Patent Citation 1 discloses the invention in which a plurality of spiral grooves of moving a fluid to the high pressure chamber side is provided in circumferential direction on a seal face of a rotating ring (hereinafter, called as "Background Art 1.")

As the invention relating to sliding parts, the present applicant has already filed the application of the invention in which a plurality of dimples 50 is provided on a sealing face S, a cavitation formation region 50a on the upstream side of each of the dimples 50 is arranged close to the low pressure fluid side, a positive pressure generation region 50b on the downstream side is arranged close to the high pressure fluid side, a fluid is suctioned in the cavitation formation region 50a on the upstream side, and the suctioned fluid is returned to the high pressure side from the positive pressure generation region 50b on the downstream side shown in FIG. 6 (hereinafter, called as "Background Art 2". Refer to Patent Citation 2.)

However, in Background Art 1 described above, in a case where there is a pressure difference between inner and outer peripheries of the sealing face, a pumping operation against the pressure is required, and there is sometimes a case where the fluid cannot be pushed back depending on the magnitude of the pressure. Therefore, although leakage can be prevented in a case of a small pressure difference, there is a problem that a leakage amount is unavoidably high in a case of a large pressure difference.

Background Art 2 described above is the remarkable invention in a point that both functions of leakage prevention and lubrication can be exerted irrespective of the magnitude of the pressure difference between the inner and outer peripheries of the sealing face. However, since a basic shape of each of the dimples 50 is a crank shape, movement of the fluid from the cavitation formation region 50a on the upstream side to the positive pressure generation region 50b on the downstream side somewhat lacks smoothness. Thus, there is a fear that dynamic pressure generation on the low pressure fluid side X in the positive pressure generation region 50b becomes excessive and leads to leakage. Since a distance from a pressure peak position of the dynamic pressure generation region to the low pressure fluid side cannot be sufficiently large, there is a problem of a fear that the insufficient distance leads to leakage. Further, since the cavitation formation region on the upstream side is arranged close to the low pressure fluid side, radial width of the cavitation formation region cannot be increased. Thus, there is a problem that a negative pressure generation starting point cannot be increased.

CITATION LIST

Patent Literature

Patent Citation 1: Japanese Laid-open Patent Publication No. 8-193662 (Page 4, FIGS. 5, 6)

Patent Citation 2: International Publication No. 2014/050920

SUMMARY OF INVENTION

Technical Problem

The present invention relates to improvement of the invention described in Patent Citation 2, and an objective thereof is to provide sliding parts having, by smoothening movement of a fluid from a cavitation formation region on the upstream side to a positive pressure generation region on the downstream side in a dent part such as a dimple formed on a sealing face (called as the "dimple" in this description), both functions of furthermore leakage prevention and lubrication irrespective of the magnitude of a pressure difference between inner and outer peripheries of the sealing face.

At the same time, an objective of the present invention is to provide sliding parts in which the function of the leakage prevention is furthermore improved by increasing a negative pressure generation starting point and disposing the cavitation formation regions over substantially all the periphery on the low pressure fluid side.

Solution to Problem

In order to achieve the foregoing objectives, a first aspect of the sliding parts of the present invention is a pair of sliding parts in which a plurality of dimples is provided independently from each other in the circumferential direction on one of sealing faces that relatively slide on each other, characterized in that:

each of the dimples is formed along the circumferential direction with substantially fixed width from a cavitation formation region on an upstream side of each of the dimples to a positive pressure generation region on a downstream side of each of the dimples, an upstream beginning end of the cavitation formation region is formed in a tapered shape inclined with respect to a rotating direction of the opposing sealing face from a low pressure fluid side toward a high pressure fluid side, and disposed so as to overlap a positive pressure generation region of the dimple arranged on the upstream side in a radial direction, and a low pressure fluid side edge of the positive pressure generation region is formed in a tapered shape inclined with respect to the rotating direction of the opposing sealing face from the low pressure fluid side toward the high pressure fluid side and smoothly connected to a low pressure fluid side edge of the cavitation formation region.

According to this aspect, the fluid to be leaked out to the low pressure fluid side from the positive pressure generation region of the dimple on the upstream side flows into the upstream side in the cavitation formation region of the dimple on the downstream side. Thus, leakage to the low pressure fluid side is inhibited and a sealing property is improved. That is, since the cavitation formation regions are disposed over substantially all the periphery on the low pressure fluid side, a function of leakage prevention can be furthermore improved.

Radial width of the cavitation formation region can be increased. Thus, a negative pressure generation starting point can be increased and the sealing property can be improved.

Further, since the cavitation formation region is increased, shearing resistance of the sealing face can be reduced, and torque of the sliding part can be lowered.

Further, the fluid flowing into the cavitation formation region smoothly flows to the positive pressure generation region and positive pressure is not generated in a flow of the fluid collided with the low pressure fluid side edge. Thus, dynamic pressure generation on the leading end side in the positive pressure generation region on the low pressure fluid side can be suppressed, and an amount of the fluid leaked out to the low pressure fluid side can be reduced.

Further, a distance to the low pressure fluid side from a pressure peak position on the leading end side in a positive pressure generation portion where positive pressure is generated in the positive pressure generation region is increased. As a result, pressure gradient is decreased and a leakage amount can be reduced.

A second aspect of the sliding parts of the present invention relates to the first aspect, characterized in that:

a positive pressure generation mechanism formed from a Rayleigh step communicating with the high pressure fluid side via a radial groove is disposed on the high pressure fluid side of the sealing face in which the dimples are provided or the high pressure fluid side of the other sealing face, a pressure release groove is provided between the positive pressure generation mechanism and the dimples, and the pressure release groove communicates with the high pressure fluid side via the radial groove.

According to this aspect, a fluid film can be formed and lubrication can be made by the positive pressure generation mechanism formed from the Rayleigh step which is disposed on the high pressure fluid side, and sealing and the lubrication can be made by the dimples disposed on the low pressure fluid side. Thus, a sealing operation by the dimples can be ensured.

A third aspect of the sliding parts of the present invention relates to the first aspect, characterized in that:

a positive pressure generation mechanism formed from a Rayleigh step communicating with the high pressure fluid side is disposed on the high pressure fluid side of the sealing face in which the dimples are provided or the high pressure fluid side of the other sealing face.

According to this aspect, a fluid film is formed and the lubrication is made by the positive pressure generation mechanism formed from the Rayleigh step which is disposed on the high pressure fluid side, and the sealing and the lubrication are made by the dimples disposed on the low pressure fluid side, and there is no need for providing deep grooves such as a radial groove and a pressure release groove. Thus, there is an advantage that processing is easy.

Advantageous Effects of Invention

The present invention exhibits the following superior effects.

(1) According to the first aspect, the fluid to be leaked out to the low pressure fluid side from the positive pressure generation region of the dimple on the upstream side flows into the upstream side in the cavitation formation region of the dimple on the downstream side. Thus, the leakage to the low pressure fluid side is inhibited and the sealing property is improved. That is, since the cavitation formation regions are disposed over substantially all the periphery on the low pressure fluid side, the function of the leakage prevention can be furthermore improved.

The radial width of the cavitation formation region can be increased. Thus, the negative pressure generation starting point can be increased and the sealing property can be improved.

Further, since the cavitation formation region is increased, the shearing resistance of the sealing face can be reduced, and the torque of the sliding parts can be lowered.

Further, the fluid flowing into the cavitation formation region smoothly flows to the positive pressure generation region and positive pressure is not generated in the flow of the fluid collided with the low pressure fluid side edge. Thus, the dynamic pressure generation on the leading end side in the positive pressure generation region on the low pressure fluid side can be suppressed, and the amount of the fluid leaked out to the low pressure fluid side can be reduced.

(2) According to the second aspect, the positive pressure generation mechanism formed from the Rayleigh step communicating with the high pressure fluid side via the radial groove is disposed on the high pressure fluid side on the sealing face in which the dimples are provided or the high pressure fluid side on the other, the sealing face pressure release groove is provided between the positive pressure generation mechanism and the dimples, and the pressure release groove communicates with the high pressure fluid side via the radial groove. Thus, the fluid film can be formed and the lubrication can be made by the positive pressure generation mechanism formed from the Rayleigh step which is disposed on the high pressure fluid side, and the sealing and the lubrication can be made by the dimples disposed on the low pressure fluid side. Therefore, the sealing operation by the dimples can be ensured.

(3) According to the third aspect, the positive pressure generation mechanism formed from the Rayleigh step communicating with the high pressure fluid side is disposed on the high pressure fluid side on the sealing face in which the dimples are provided or the high pressure fluid side on the other sealing face. Thus, the fluid film is formed and the lubrication is made by the positive pressure generation mechanism formed from the Rayleigh step which is disposed on the high pressure fluid side, and the sealing and the lubrication are made by the dimples disposed on the low pressure fluid side, and there is no need for providing deep grooves such as the radial groove and the pressure release groove. Therefore, there is the advantage that the processing is easy.

DESCRIPTION OF EMBODIMENTS

Hereinafter, with reference to the drawings, modes for carrying out the present invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

Figure 1:
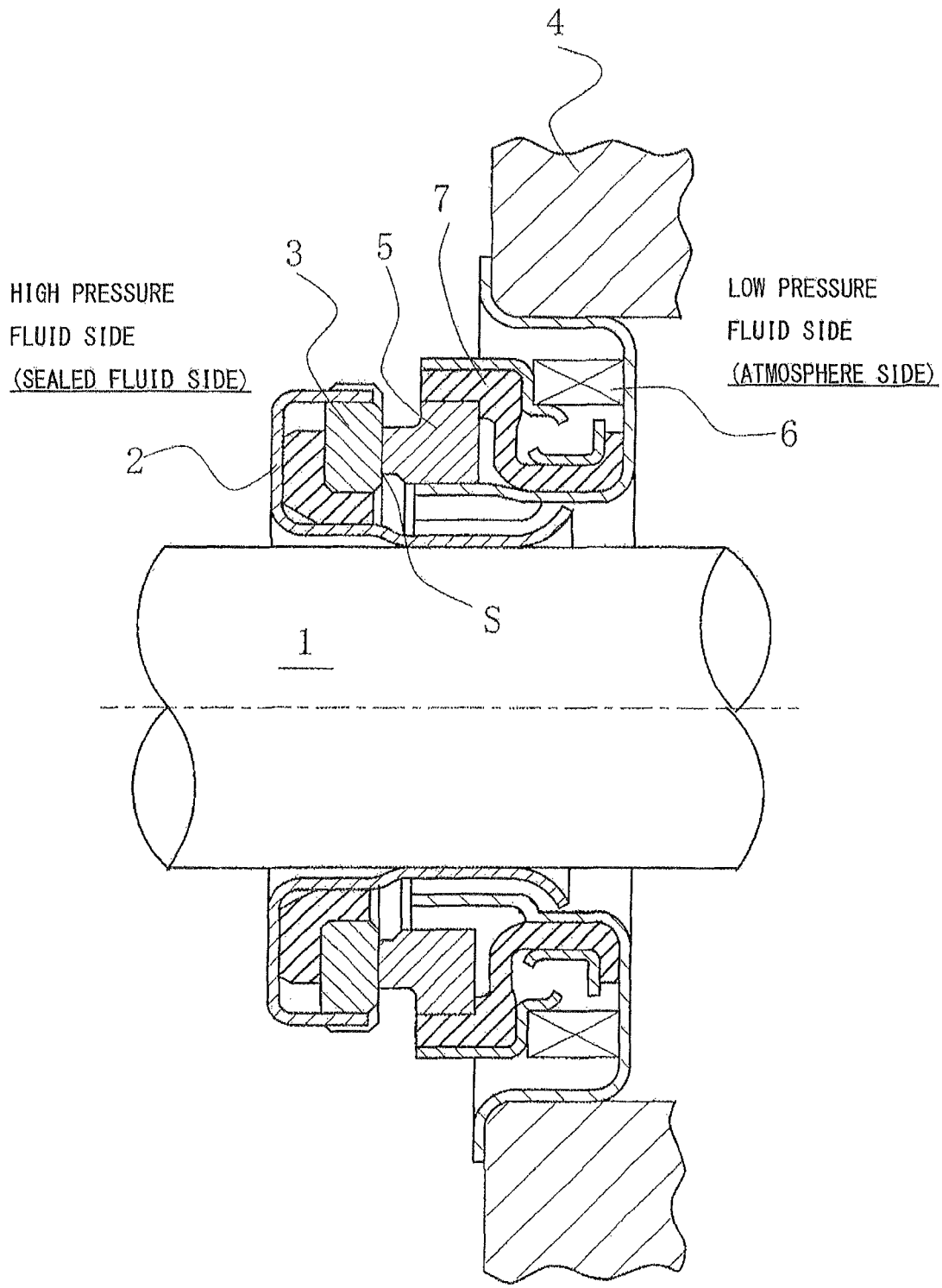
FIG. 1 is a vertically sectional view illustrating one example of a mechanical seal according to embodiments of the present invention.
Figure 2:
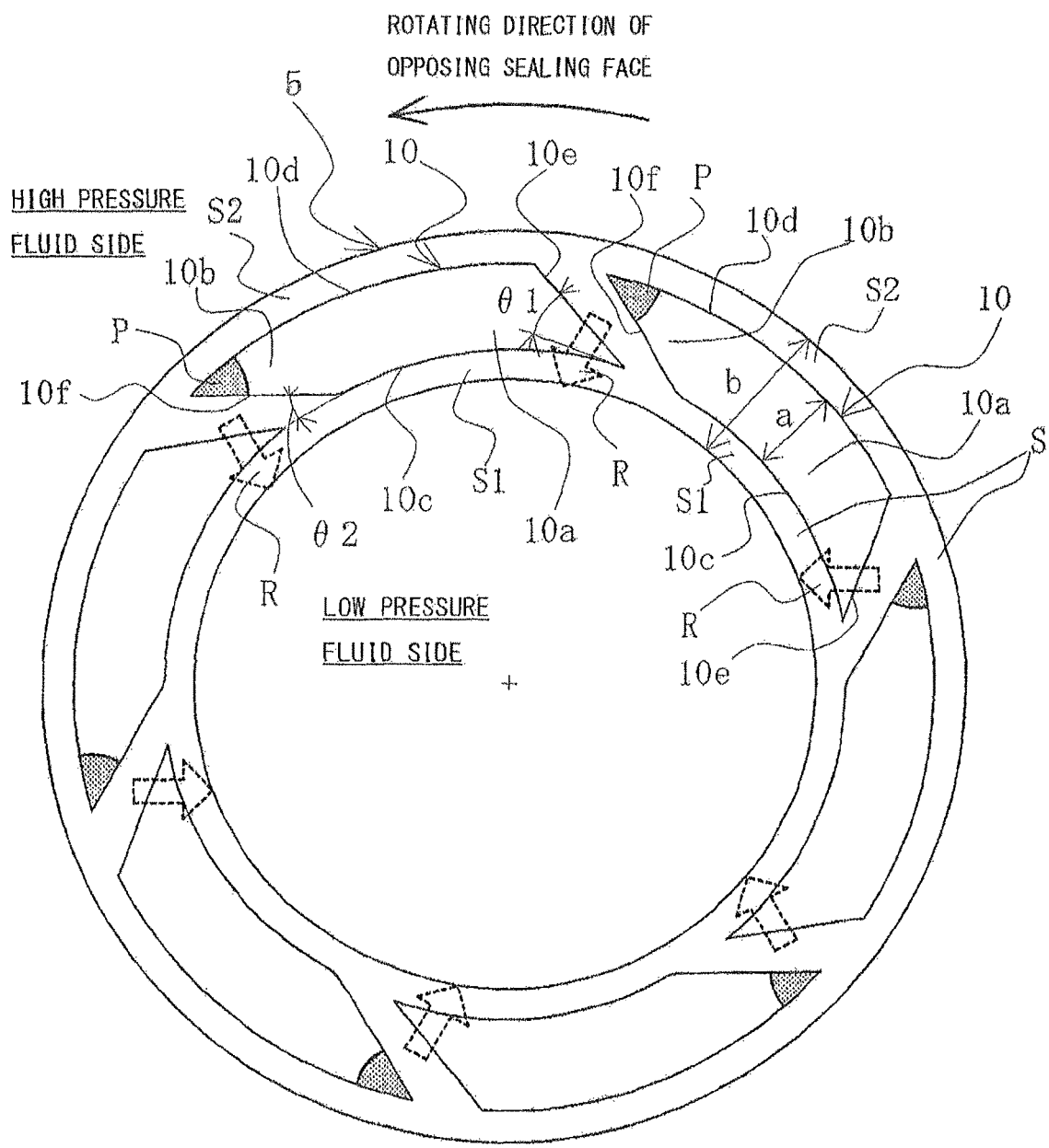
FIG. 2 illustrates a sealing face of a sliding part according to a first embodiment of the present invention.
Figure 3:
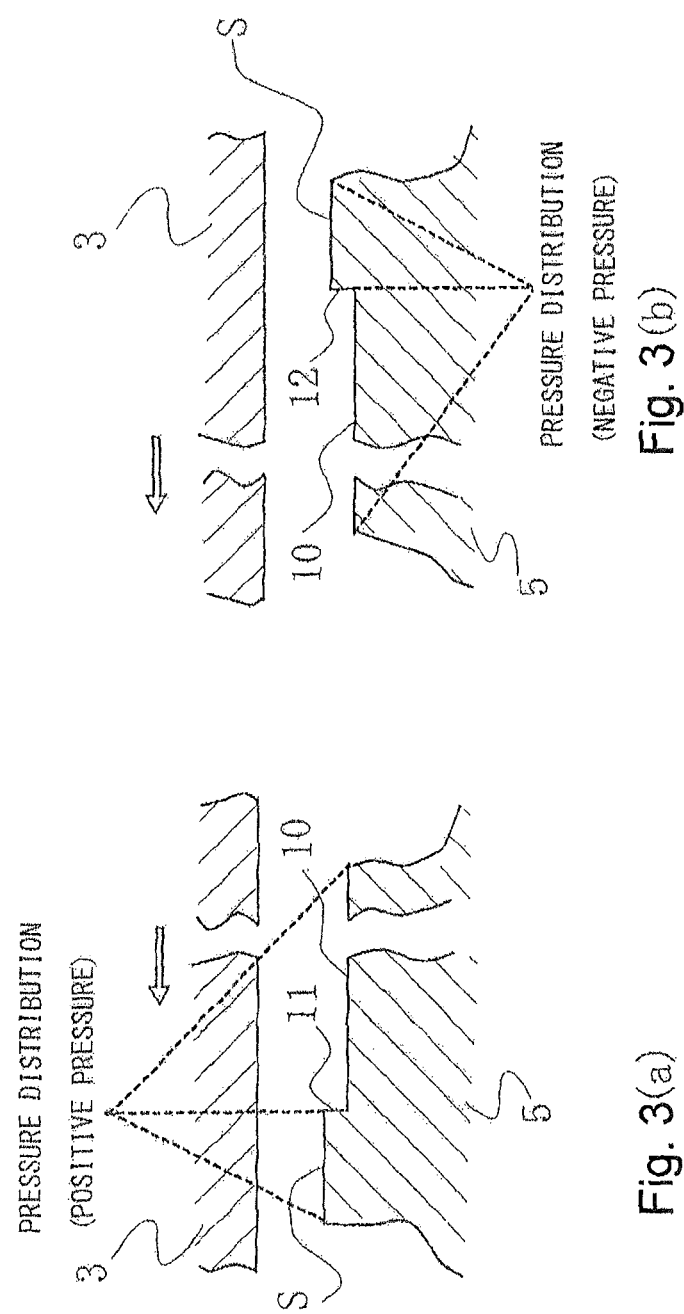
FIG. 3A is a view for illustrating a positive pressure generation mechanism formed from a narrowing gap (step) on the downstream side in the dimple.
FIG. 3B is a view for illustrating a negative pressure generation mechanism formed from an extending gap (step) on the upstream side in the dimple.

With reference to FIGS. 1 to 3, sliding parts according to a first embodiment of the present invention will be described.

It should be noted that in the present embodiment, a case where parts forming a mechanical seal are the sliding parts will be described as an example.

FIG. 1 is a vertically sectional view illustrating one example of the mechanical seal that is an inside mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 is provided via a sleeve 2 in a state that the rotating ring can be rotated integrally with this rotating shaft 1, an annular stationary ring 5 is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias this stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

It should be noted that the present invention is not limited to the inside mechanical seal but, needless to say, can be applied to an outside mechanical seal for sealing a sealed fluid on the high pressure fluid side to be leaked out from an inner periphery of a sealing face toward an outer periphery.

FIG. 2 illustrates the sealing face of the sliding part according to the first embodiment of the present invention. A case where dimples are formed on the sliding face of the stationary ring 5 of FIG. 1 will be described as an example.

It should be noted that a case where dimples are formed on the sliding face of the rotating ring 3 is the same.

In FIG. 2, a plurality of dimples 10 is provided in the circumferential direction on the sealing face S. The dimples 10 do not communicate with the high pressure fluid side and the low pressure fluid side. The dimples 10 are provided independently from each other and separated from each other in the circumferential direction. The number, an area, and depth of the dimples 10 are appropriately determined in accordance with a diameter of the sliding part, width and relative movement speed of the sealing face, conditions of sealing and lubricity, and the like. However, shallow dimples having a large area are more preferable in terms of a fluid lubrication operation and liquid film formation. In a case of FIG. 2, the six dimples 10 are provided at equal intervals. However, four dimples or eight dimples may be provided at equal intervals.

Each of the dimples 10 is formed along the circumferential direction with substantially fixed width so as to form an arc shape from a cavitation formation region 10a on the upstream side to a positive pressure generation region 10b on the downstream side.

A low pressure fluid side edge 10c of the cavitation formation region 10a of the dimple 10 is isolated from the low pressure fluid side by the sealing face 51, and a high pressure fluid side edge 10d is similarly isolated from the high pressure fluid side by the sealing face S2.

A fluid suctioned in the cavitation formation region 10a of the dimple 10 passes through an inside of the dimples and generates dynamic pressure (positive pressure) in the positive pressure generation region 10b, and is returned to the high pressure fluid side which is near in the radial direction.

It should be noted that with radial width b of the sealing face, radial width a of the dimple 10 is desirably set to a=(⅕ to ⅘)b.

An upstream beginning end 10e of the cavitation formation region 10a is formed in a tapered shape inclined with respect to the rotating direction of the opposing sealing face from the low pressure fluid side toward the high pressure fluid side, and disposed so as to overlap the positive pressure generation region 10b of the dimple 10 arranged on the upstream side in the radial direction. A taper angle θ1 made by the upstream beginning end 10e and the low pressure fluid side edge 10c is set to for example 0°<θ1≤45°. The upstream beginning end 10e on the upstream side is not limited to a straight line but may be a curve such as a single smooth arc shape.

Further, the upstream beginning end 10e of the cavitation formation region 10a is formed in a tapered shape inclined so as to be substantially parallel to a low pressure fluid side edge 10f of the positive pressure generation region 10b of the dimple 10 arranged on the upstream side, and disposed so as to overlap at least a part of a hatched substantially-triangle region P where the positive pressure is generated in the positive pressure generation region 10b of the dimple 10 arranged on the upstream side in the radial direction.

It should be noted that a state that the upstream beginning end 10e and the low pressure fluid side edge 10f are "substantially parallel" to each other indicates the fact that an intersecting angle of both the parts is within a range from 0° to 30°

By forming the upstream beginning end 10e so as to make the beginning end substantially parallel to the low pressure fluid side edge 10f of the positive pressure generation region 10b of the dimple 10 arranged on the upstream side, arranging efficiency of the dimples on the sealing face S (proportion of the entire area of the dimples to the entire area of the sealing face) can be improved.

By disposing the upstream beginning end 10e so as to make the beginning end overlap the part of the hatched substantially-triangle region P where the positive pressure is generated in the positive pressure generation region. 10b of the dimple 10 arranged on the upstream side in the radial direction, the fluid shown by an arrow R to be leaked out to the low pressure fluid side from the positive pressure generation region 10b of the dimple 10 on the upstream side flows into the upstream side in the cavitation formation region 10a of the dimple 10 on the downstream side. Thus, leakage to the low pressure fluid side is inhibited and a sealing property is improved. That is, since the cavitation formation regions are disposed over substantially all the periphery on the low pressure fluid side, a function of leakage prevention can be furthermore improved.

Further, the radial width of the cavitation formation region can be increased. Thus, a negative pressure generation starting point can be increased and the sealing property can be improved.

Further, since the cavitation formation region is increased, shearing resistance of the sealing face can be reduced, and torque of the sliding part can be lowered.

The low pressure fluid side edge 10f of the positive pressure generation region 10b is formed in a tapered shape inclined with respect to the rotating direction of the opposing sealing face from the low pressure fluid side toward the high pressure fluid side and smoothly connected to the low pressure fluid side edge 10c of the cavitation formation region 10a. A taper angle θ2 made by the low pressure fluid side edge 10f of the positive pressure generation region 10b and the low pressure fluid side edge 10c of the cavitation formation region 10a is set to for example $0°<θ2≤45°$. The low pressure fluid side edge 10f is not limited to a straight line but may be a projected or recessed curve toward the low pressure fluid side. In a case of a straight line, a single straight line is desirable. In a case of a curve, curvature is desirably uniform.

As described above, the low pressure fluid side edge 10f of the positive pressure generation region 10b is formed in a tapered shape inclined with respect to the rotating direction of the opposing sealing face from the low pressure fluid side toward the high pressure fluid side and smoothly connected to the low pressure fluid side edge 10c of the cavitation formation region 10a. Thus, the fluid flowing into the cavitation formation region 10a smoothly flows to the positive pressure generation region 10b and the positive pressure is not generated in a flow of the fluid collided with the low pressure fluid side edge 10f. Therefore, in comparison to the sliding parts of Background Art 2 described above, dynamic pressure generation on the leading end side in the positive pressure generation region 10b on the low pressure fluid side can be suppressed, and an amount of the fluid leaked out to the low pressure fluid side can be reduced. A positive pressure generation portion where the positive pressure is generated in the positive pressure generation region 10b is the hatched substantially-triangle region P of FIG. 2. Thus, a distance from a pressure peak position on the leading end side to the low pressure fluid side is increased. As a result, pressure gradient is decreased and a leakage amount can be reduced.

At the time, the taper angle θ2 of the low pressure fluid side edge 10f of the positive pressure generation region 10b is desirably as small as possible from a viewpoint to let the fluid collided with the low pressure fluid side edge 10f smoothly flow and not to generate the positive pressure.

A shape of the dimple 10 illustrated in FIG. 2 is only one example. The point is, the dimple is only required to be formed along the circumferential direction with substantially fixed width, and regarding to the cavitation formation region 10a, the beginning end 10e is only required to be formed in a tapered shape inclined with respect to the rotating direction of the opposing sealing face from the low pressure fluid side toward the high pressure fluid side, and disposed so as to overlap the positive pressure generation region 10b of the dimple 10 arranged on the upstream side in the radial direction. The taper angle, a degree of overlap with the positive pressure generation region 10b of the dimple 10 on the upstream side in the radial direction, and the like may be determined on the basis of design.

Regarding the positive pressure generation region 10b, the low pressure fluid side edge 10f of the positive pressure generation region 10b is only required to be formed in a tapered shape inclined with respect to the rotating direction of the opposing sealing face from the low pressure fluid side toward the high pressure fluid side and smoothly connected to the low pressure fluid side edge 10c of the cavitation formation region 10a. For example, the low pressure fluid side edge may be formed in a shape like a side surface of a bow part of a ship.

With reference to FIG. 3, a positive pressure generation mechanism and a negative pressure generation mechanism in a case where the dimples are provided in the present invention will be described.

In FIG. 3A, as shown by an arrow, the rotating ring 3 is rotated and moved anti-clockwise with respect to the stationary ring 5. When the dimple 10 is formed on the sealing face S of the stationary ring 5, a narrowing gap (step) 11 exists on the downstream side in the dimple 10. The sealing face of the opposing rotating ring 3 is flat.

When the rotating ring 3 is relatively moved in the direction shown by the arrow, the fluid lying between the sealing faces of the rotating ring 3 and the stationary ring 5 intends to follow and move in the moving direction of the rotating ring 3 by viscosity thereof. Thus, at the time, dynamic pressure (positive pressure) as shown by broken lines is generated by the existence of the narrowing gap (step) 11.

In FIG. 3B, as shown by an arrow, the rotating ring 3 is rotated and moved anti-clockwise with respect to the stationary ring 5. When the dimple 10 is formed on the sealing face S of the stationary ring 5, an extending gap (step) 12 exists on the upstream side in the dimple 10. The sealing face of the opposing rotating ring 3 is flat.

When the rotating ring 3 is relatively moved in the direction shown by the arrow, the fluid lying between the sealing faces of the rotating ring 3 and the stationary ring 5 intends to follow and move in the moving direction of the rotating ring 3 by viscosity thereof. Thus, at the time, dynamic pressure (negative pressure) as shown by broken lines is generated by the existence of the extending gap (step) 12.

Therefore, the negative pressure is generated on the upstream side in the dimple 10, and the positive pressure is generated on the downstream side. In a negative pressure generation region on the upstream side, cavitation is generated.

Second Embodiment

Figure 4:
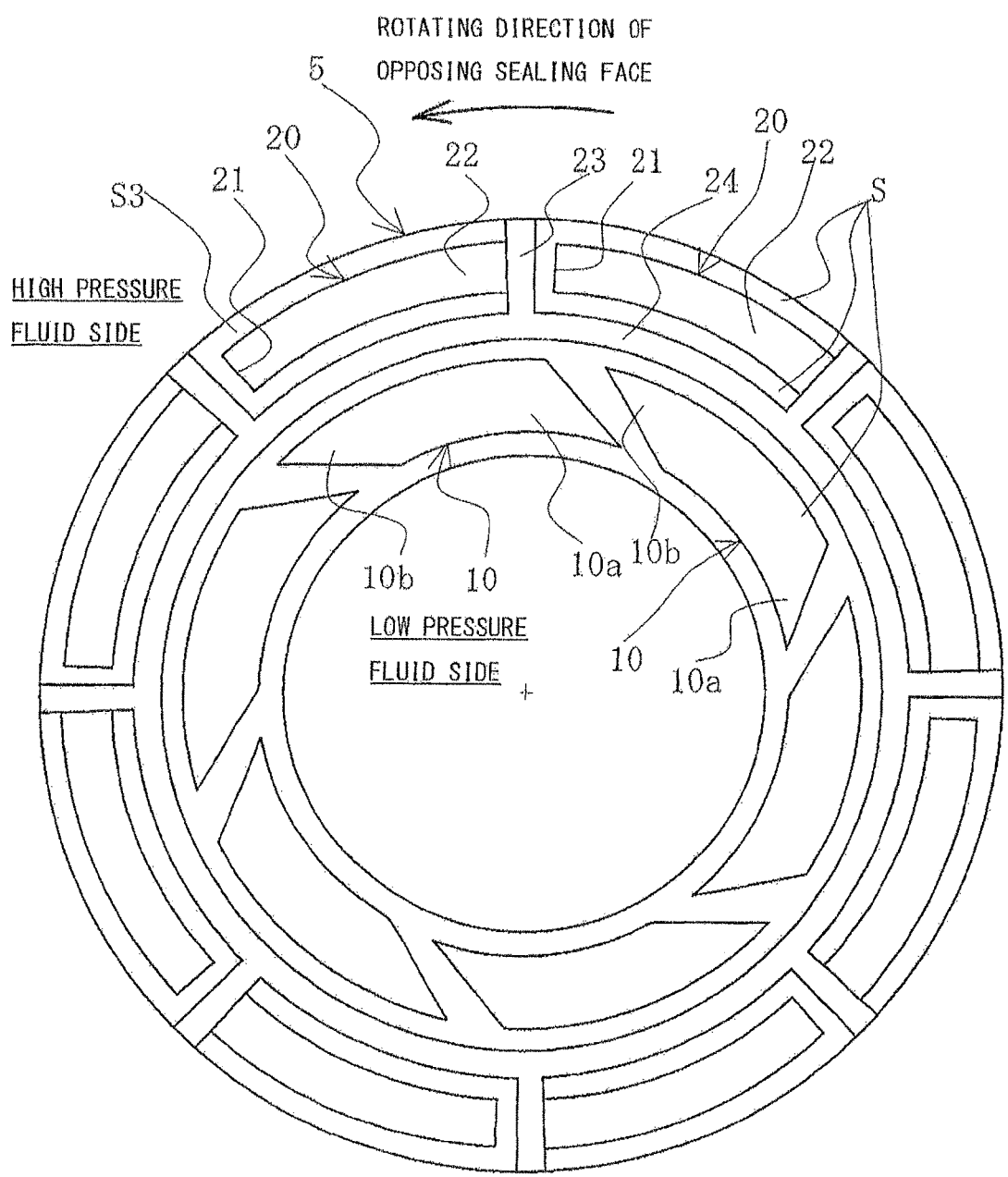
FIG. 4 illustrates a sealing face of a sliding part according to a second embodiment of the present invention.

FIG. 4 illustrates a sealing face of a sliding part according to a second embodiment of the present invention. A case where dimples are formed on the sealing face of the stationary ring 5 of FIG. 1 will be described as an example. The second embodiment is different from the first embodiment illustrated in FIG. 2 in a point that positive pressure generation mechanisms formed from Rayleigh steps are disposed on the high pressure fluid side on the sealing face in which the dimples are provided. However, the other points are basically the same as the first embodiment. The same members will be given the same reference signs and duplicated description thereof will be omitted.

In FIG. 4, on the sealing face S, dimples 10 are disposed on the low pressure fluid side and positive pressure generation mechanisms formed from Rayleigh steps 20 are disposed on the high pressure fluid side.

Each of the Rayleigh steps 20 is formed from a narrowing step 21, a groove section 22, and a radial groove 23 communicating with the high pressure fluid side. Between the Rayleigh steps 20 and the dimples 10, a pressure release groove 24 communicating with the high pressure fluid side via the radial grooves 23 is provided. The groove section 22 is disposed so as to be isolated from the high pressure fluid side by a sealing face S3 with fixed width, extending in the circumferential direction with fixed width so as to form an arc shape. Depth of the groove sections 22 is several times more than the depth of the dimples 10. The pressure release groove 24 is to release the dynamic pressure (positive pressure) generated in the Rayleigh steps 20 to the pressure of the high pressure side fluid so as to prevent the fluid from flowing into the dimples 10 on the low pressure fluid side to weaken a negative pressure generation ability of the dimples 10. The pressure release groove is to play a role of guiding the fluid to flow into the low pressure fluid side by the positive pressure generated in the Rayleigh steps 20 on the high pressure fluid side to the pressure release groove 24, and letting the fluid go to the high pressure fluid side.

In a case of FIG. 4, the six dimples 10 are provided at equal intervals, and the eight Rayleigh steps 20 are provided at equal intervals.

Depth and width of the groove sections 22, the radial grooves 23, and the pressure release groove 24 are appropriately determined in accordance with the diameter of the sliding part, the width and the relative movement speed of the sealing face, the conditions of the sealing and the lubricity, and the like. For example, the depth of the groove sections 22 is about a half to several times more than the depth of the dimples 10. The depths of the radial grooves 23 and the pressure release groove 24 are ten times more than the depth of the dimples 10 or more.

In the second embodiment, a fluid film is formed and the lubrication is made by the positive pressure generation mechanisms formed from the Rayleigh steps 20 which are disposed on the high pressure fluid side, and the sealing and the lubrication are made by the dimples 10 disposed on the low pressure fluid side. The fluid suctioned in the cavitation formation region 10a of the dimple 10 is guided from the positive pressure generation region 10b to the pressure release groove 24 and returned to the high pressure fluid side via the radial groove 23. In such a way, in this example, the fluid film can be formed and the lubrication can be made by the positive pressure generation mechanisms formed from the Rayleigh steps 20 which are disposed on the high pressure fluid side, and the sealing and the lubrication can be made by the dimples 10 disposed on the low pressure fluid side. Thus, a sealing operation by the dimples 10 can be ensured.

Third Embodiment

Figure 5:
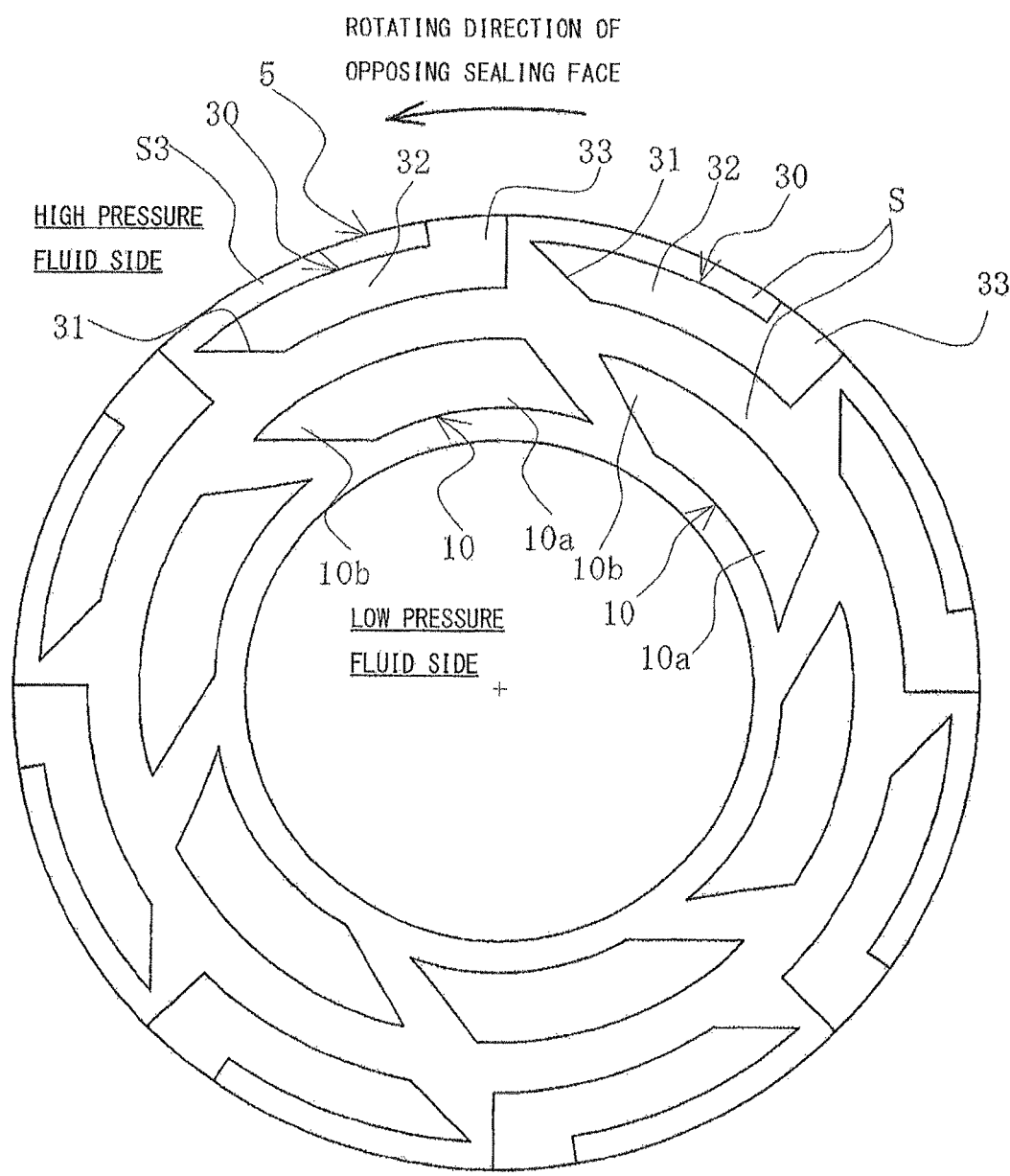
FIG. 5 illustrates a sealing face of a sliding part according to a third embodiment of the present invention.
Figure 6:
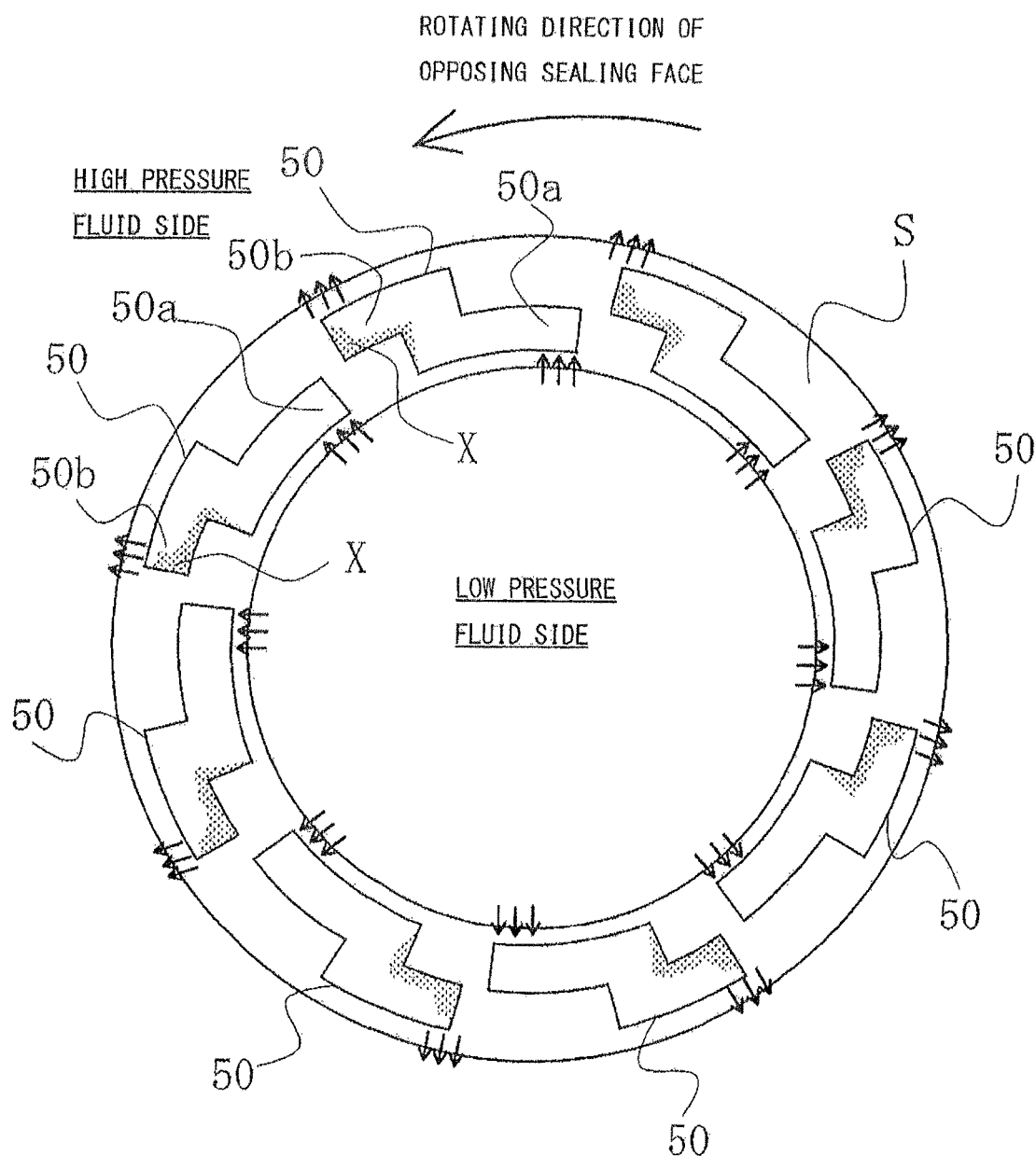
FIG. 6 illustrates a sealing face of Patent Citation 2.

FIG. 5 illustrates a sealing face of a sliding part according to a third embodiment of the present invention. A case where dimples are formed on the sealing face of the stationary ring 5 of FIG. 1 will be described as an example. The third embodiment is different from the first embodiment illustrated in FIG. 2 in a point that positive pressure generation mechanisms formed from Rayleigh steps are disposed on the high pressure fluid side on the sealing face in which the dimples are provided. However, the other points are basically the same as the first embodiment. The same members will be given the same reference signs and duplicated description thereof will be omitted.

In FIG. 5, on the sealing face S, dimples 10 are disposed on the low pressure fluid side and positive pressure generation mechanisms formed from Rayleigh steps 30 are disposed on the high pressure fluid side.

Each of the Rayleigh steps 30 is formed from a narrowing step 31, a groove section 32, and a radial groove 33 communicating with the high pressure fluid side on the upstream side of the groove section 32. The sealing face S lies between the Rayleigh steps 30 and the dimples 10.

The groove section 32 is disposed so as to be isolated from the high pressure fluid side by a sealing face S3 with fixed width, extending in the circumferential direction with fixed width so as to form an arc shape. Depth of the groove sections 32 is about a half to several times more than the depth of the dimples 10.

The narrowing step 31 is formed in a tapered shape inclined with respect to the rotating direction of the opposing sealing face from the low pressure fluid side toward the high pressure fluid side. When the narrowing step 31 is formed in such a way, a peak of the positive pressure generated in the vicinity of the narrowing step 31 is brought close to the high pressure fluid side. Thus, the high-pressure fluid is mainly discharged to the high pressure fluid side, and a flow to the side of the dimples 10 is reduced.

The radial grooves 33 have width which is about the same as or not less than width of the groove sections 32.

Depth of the radial grooves 33 is about the same as the depth of the groove sections 32 and several times more than the depth of the dimples 10. Therefore, the high-pressure fluid easily flows into the groove sections 32 and the sealing face S can be sufficiently lubricated.

In the third embodiment, a fluid film is formed and the lubrication is made by the positive pressure generation mechanisms formed from the Rayleigh steps 30 which are disposed on the high pressure fluid side, and the sealing and the lubrication are made by the dimples 10 disposed on the low pressure fluid side. The fluid suctioned in the cavitation formation region 10a of the dimple 10 is returned from the positive pressure generation region 10b to the high pressure fluid side while lubricating the sealing face S. In the third embodiment, there is no need for providing deep grooves such as the radial grooves 23 and the pressure release groove 24 unlike the second embodiment. Thus, there is an advantage that processing is easy.

The embodiments of the present invention are described above with the drawings. However, specific configurations are not limited to these embodiments but modifications and additions that are made within the range not departing from the gist of the present invention are also included in the present invention.

For example, although the example that the sliding parts are used for any of a pair of rotating and stationary sealing rings in a mechanical seal device is described in the above embodiments, the sliding parts can also be utilized as sliding parts of a bearing that slides on a rotating shaft while sealing lubricating oil on one side in the axial direction of a cylindrical sealing face.

In addition, for example, although the case where the high-pressure sealed fluid exists on the outer peripheral side is described in the above embodiments, the present invention can also be applied to a case where the high-pressure fluid exists on the inner peripheral side. In that case, the cavitation formation region of the dimple may be disposed on the outer peripheral side and the positive pressure generation region may be disposed on the inner peripheral side.

In addition, for example, in the above embodiments, regarding the shape of the dimple, the cavitation formation region 10a on the upstream side extends in the circumferential direction with fixed width so as to form an arc shape, and the positive pressure generation region 10b on the downstream side is formed in an extending shape so as to be inclined with respect to the rotating direction of the opposing sealing face with the substantially same width as the width of the cavitation formation region 10a from the cavitation formation region 10a to the high pressure fluid side. However, the present invention is not limited to this. For example, the dimple may be disposed in such a manner that the width is different between the cavitation formation region 10a and the positive pressure generation region 10b.

In addition, in the second and third embodiments, the case where the dimples 10 and the positive pressure generation mechanisms formed from the Rayleigh steps 20, 30 are disposed on the sealing face of the stationary ring 5 among the rotating ring 3 and the stationary ring 5 is described. However, the present invention is not limited to this. The dimples and the positive pressure generation mechanisms may be disposed on the sealing face of the rotating ring 3, or the dimples 10 may be disposed on the sealing face of one of the rotating ring 3 and the stationary ring 5 and the positive pressure generation mechanisms formed from the Rayleigh steps 20, 30 may be disposed on the other sealing face. For example, the dimples 10 may be disposed on the sealing face of the rotating ring 3 and the positive pressure generation mechanisms formed from the Rayleigh steps 20, 30 may be disposed on the sealing face of the stationary ring 5. In that case, a sealing function and a lubrication function can be furthermore improved. It should be noted that the radial grooves 23 and the pressure release groove 24 are disposed on the side where the positive pressure generation mechanisms formed from the Rayleigh steps 20 are provided.

REFERENCE SIGNS LIST

1 Rotating shaft
2 Sleeve
3 Rotating ring
4 Housing
5 Stationary ring
6 Coiled wave spring
7 Bellows
10 Dimple
10a Cavitation formation region
10b Positive pressure generation region
10c Low pressure fluid side edge of cavitation formation region
10d High pressure fluid side edge of cavitation formation region
10e Upstream beginning edge of cavitation formation region
10f Low pressure fluid side edge of positive pressure generation region
11 Narrowing gap (step)
12 Extending gap (step)
20 Rayleigh step (positive pressure generation mechanism)
21 Narrowing step
22 Groove section
23 Radial groove
24 Pressure release groove
30 Rayleigh step
31 Narrowing step
32 Groove section
33 Radial groove
S Sealing face
P Positive pressure generation portion
θ1 Taper angle made by upstream beginning end and low pressure fluid side edge
θ2 Taper angle made by low pressure fluid side edge of positive pressure generation region and low pressure fluid side edge of cavitation formation region
R Fluid to be leaked out to low pressure fluid side from positive pressure generation region
a Radial width of dimple
b Radial width of sealing face

The invention claimed is:

1. A pair of sliding parts in which a plurality of dimples is provided independently from each other and separated from each other in a circumferential direction on one of sealing faces that relatively slide on each other, wherein:

each of the dimples is formed along the circumferential direction with substantially fixed width from a cavitation formation region on an upstream side of each of the dimples to a positive pressure generation region on a downstream side of each of the dimples, wherein the dimples communicate with neither a high pressure fluid side nor a low pressure fluid side of the sliding part, the low pressure fluid side edge of the cavitation formation region of the dimple is isolated from the low pressure fluid side by the sealing face, and the high pressure fluid side edge of the cavitation formation region of the dimple is isolated from the high pressure fluid side by the sealing face, the low pressure fluid side edge of the cavitation formation region is formed in an arc shape, an upstream end of the cavitation formation region is formed in a tapered shape inclined to the low pressure fluid side edge of the cavitation formation region and formed in an arc shape with respect to a rotating direction of the opposing sealing face from the low pressure fluid side toward a high pressure fluid side, and disposed so as to overlap a positive pressure generation region of the dimple arranged on the upstream side in a radial direction, and a low pressure fluid side edge of the positive pressure generation region is formed in a tapered shape inclined to the low pressure fluid side edge of the cavitation formation region and formed in an arc shape with respect to the rotating direction of the opposing sealing face from the low pressure fluid side toward the high pressure fluid side and smoothly connected to a low pressure fluid side edge of the cavitation formation region.

2. The sliding parts as set forth in claim 1, wherein:

a positive pressure generation mechanism formed from a Rayleigh step communicating with the high pressure fluid side via a radial groove is disposed on the high pressure fluid side on the sealing face in which the dimples are provided or the high pressure fluid side on the other sealing face, a pressure release groove is provided between the positive pressure generation mechanism and the dimples, and the pressure release groove communicates with the high pressure fluid side via the radial groove.

3. The sliding parts as set forth in claim 1, wherein:
a positive pressure generation mechanism formed from a Rayleigh step communicating with the high pressure fluid side is disposed on the high pressure fluid side on the sealing face in which the dimples are provided or the high pressure fluid side on the other sealing face.

* * * * *